May 8, 1962  T. H. CLINE ET AL  3,033,188
COOKING RANGE

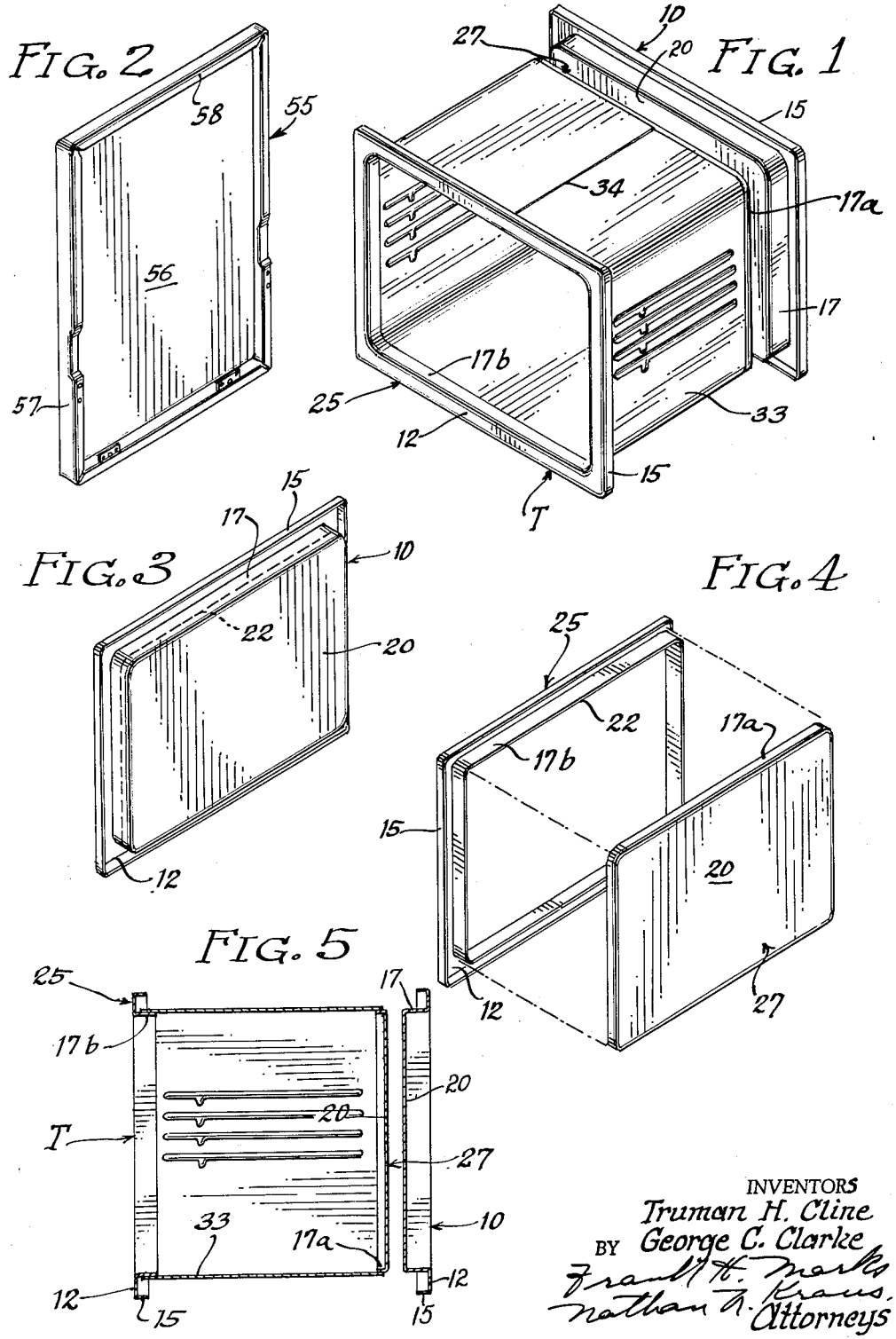

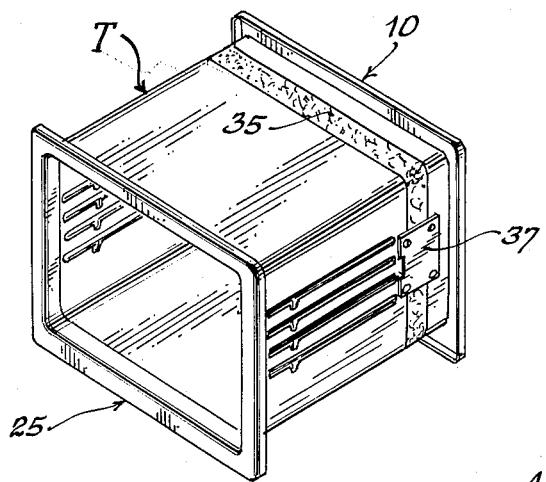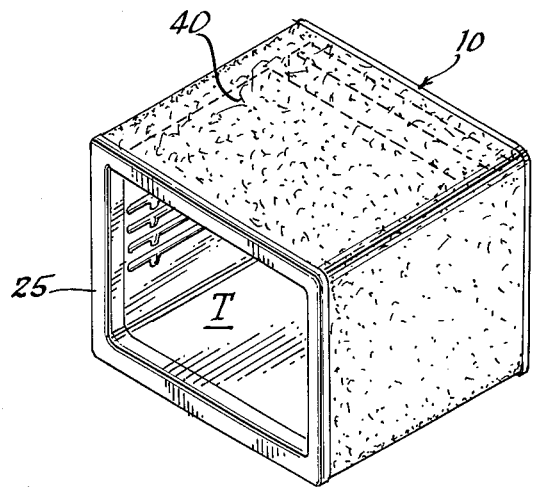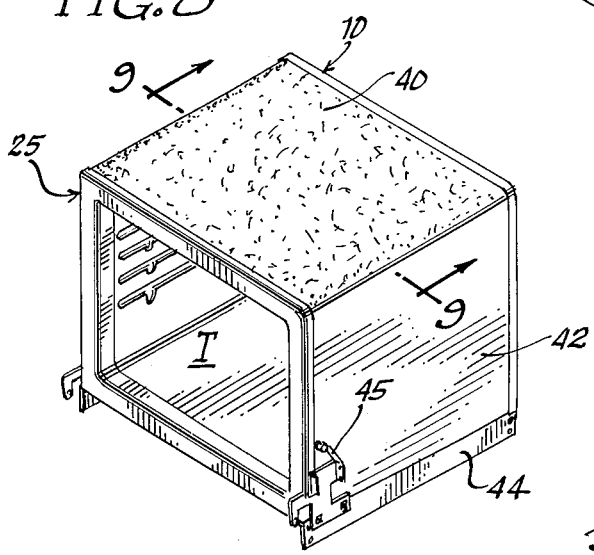

Filed Aug. 8, 1958  7 Sheets-Sheet 3

INVENTORS
Truman H. Cline
George C. Clarke
BY
Frank H. Marks
Nathan N. Kraus
Attorneys May 8, 1962 — T. H. CLINE ET AL — 3,033,188
COOKING RANGE
Filed Aug. 8, 1958 — 7 Sheets-Sheet 4

INVENTORS
Truman H. Cline
George C. Clarke
BY
Attorneys

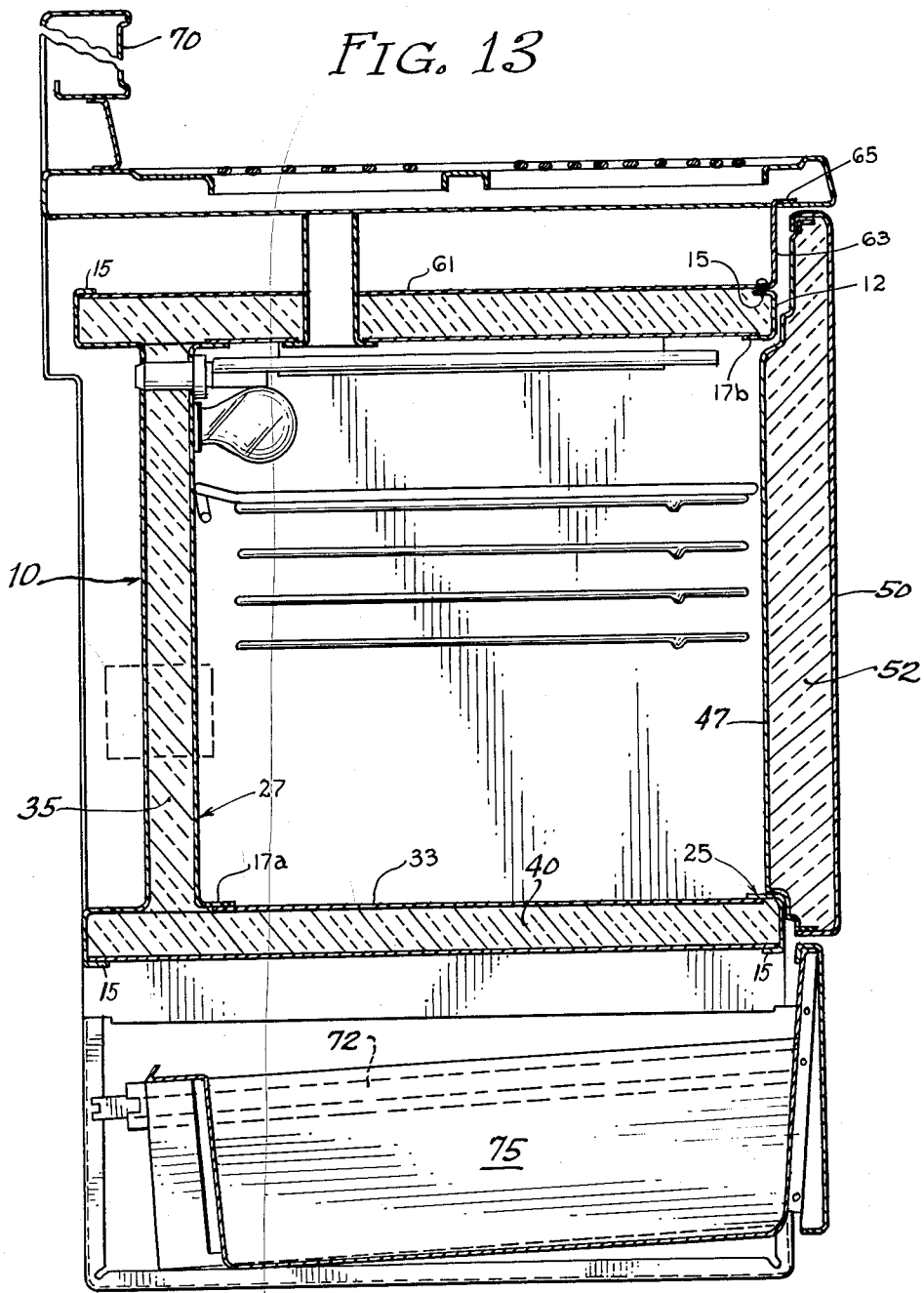

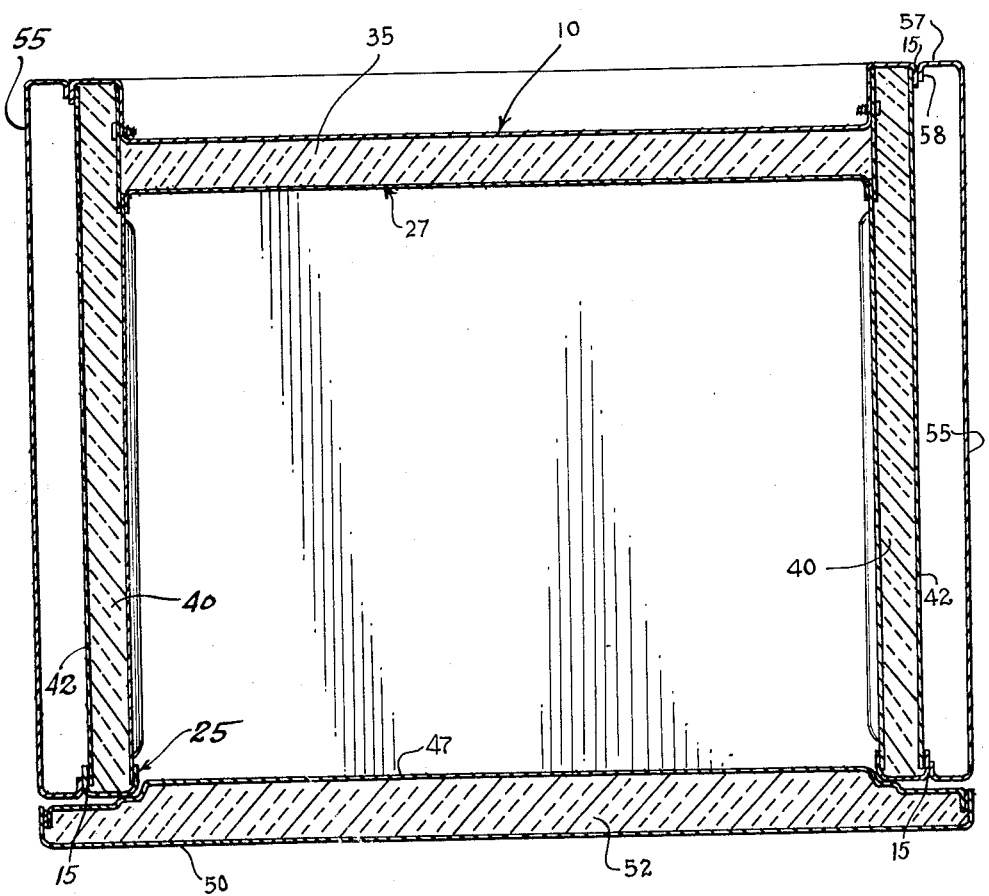

May 8, 1962   T. H. CLINE ET AL   3,033,188
COOKING RANGE

Filed Aug. 8, 1958   7 Sheets-Sheet 7

INVENTORS
Truman H. Cline
George C. Clarke
BY
Attorneys

United States Patent Office 3,033,188
Patented May 8, 1962

---

3,033,188
COOKING RANGE
Truman H. Cline and George C. Clarke, Newark, Ohio, assignors to Sears, Roebuck and Co., Chicago, Ill., a corporation of New York
Filed Aug. 8, 1958, Ser. No. 754,048
5 Claims. (Cl. 126—19)

Our invention relates to cooking ranges and has to do more particularly with a new and improved structure for a range which will mark a great improvement over previously known conventional ranges from the standpoint of economy and efficiency of construction.

The conventional range, as almost universally produced, includes a skeleton steel frame supporting an oven and the other cooking elements, storage compartments, etc., panels of enameled metal or stainless steel being hung on the outside of said frame for providing an attractive trim and enclosing insulating material, etc.

According to our invention we completely eliminate such a skeleton frame.

Furthermore, our invention contemplates a range construction produced in standard elements, preferably stampings of sheet metal, such standard elements providing basic units for the construction of a variety of ranges of different sizes, capacities and forms. In this way, according to our invention, the production of a relatively large line of ranges may be accomplished with a minimum of tooling, in a relatively small floor space, with a minimum of labor and of supervision and with a substantial reduction in weight, thus effecting major economies in production and shipping costs and making possible the sale of such goods at greatly reduced prices as compared with conventional ranges.

Another object of our invention is to produce an improved oven unit of greatly simplified structure which will serve as a standard unit in a variety of different ranges.

Other objects and advantages accruing to our invention will become apparent as the description proceeds.

Referring now to the drawings forming a part of this specification and illustrating certain preferred embodiments of our invention.

FIG. 1 is a perspective view of oven parts in spaced relation forming part of our invention;

FIG. 2 is a similar view of a side panel constituting another unit of improved ranges embodying our invention;

FIG. 3 is a similar view of a stamped or pressed element utilized in the construction of oven units embodying our invention;

FIG. 4 is a similar view of the element of FIG. 3 after it has been divided into two parts, said parts shown exploded to indicate the relationship of these parts in an oven unit embodying our invention.

FIG. 5 is a vertical sectional view taken on a plane extending from front to rear of a partly fabricated oven unit forming a feature of our invention;

FIG. 6 is a perspective view of the oven parts shown in FIGS. 1–5, inclusive, after the same have been permanently assembled;

FIG. 7 is a similar view of the same after the addition of an insulating wrapper;

FIG. 8 is a similar view of the same at a later stage of the assembly operation;

FIG. 13 is a vertical sectional view through the complete range of FIG. 12 on a plane extending from front to rear thereof;

FIG. 14 is a horizontal sectional view of said range; and

Figure 15:
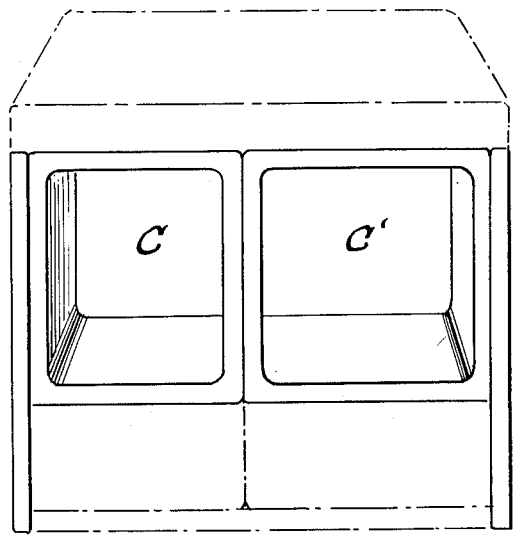
Figure 16:
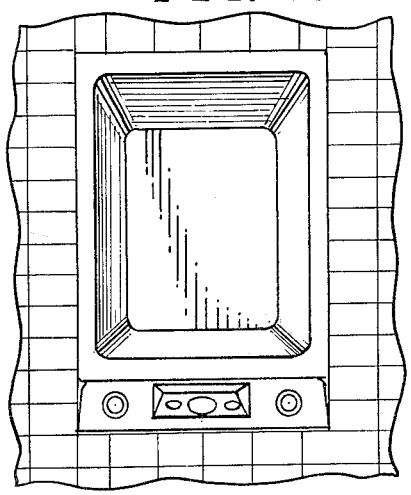
Figure 17:
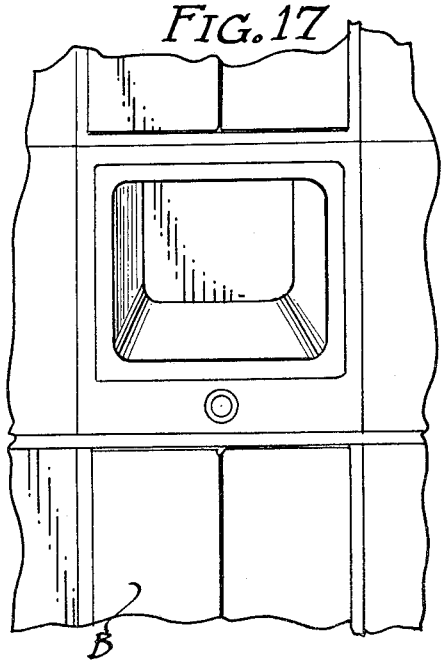

FIGS. 15–17, inclusive, are front perspective views showing utilization of our improved oven unit as a standard element embodied in other range assemblies.

A major feature of our invention consists of an oven unit featuring an economical assembly, which oven may be embodied in a variety of ranges produced in accordance with our invention.

In the manufacture of such ovens there is formed of sheet metal, preferably by a drawing operation, a pan or tray-like element as seen in FIG. 3 and indicated generally by the numeral 10. The element 10 comprises a front face part 12 with a peripheral flange 15, an inside rearwardly extending flange 17, and a large rectangular planar portion 20.

The pin-like element 10 is separated into 2 parts by cutting the inside flange 17 along line 22 as seen in FIGS. 3 and 4, thus producing the front oven rim element 25 (FIG. 1) and the oven back portion 27. It will be seen that said back portion 27 consists of the rectangular planar portion 20 and a peripheral flange portion 17a generally normal thereto while the front oven rim portion resulting from said severance and now designated by numeral 25 consists of the front face part 12, outer flange 15 and inside flange 17b.

To complete the production of an oven unit in accordance with our invention, the front portion 25 and the rear portion 27 are joined to a sleeve portion 33, as seen in FIGS. 1 and 5, said sleeve portion being preferably a strip of sheet metal formed into the desired tubular shape and butt or lap welded, as at 34, and secured to the front and rear portions 25 and 27, as by welding or brazing to the flanges 17b and 17a, respectively (FIG. 5). The result is a unitary tank-like structure T (FIGS. 1, 5 and 6).

Assembly of our improved oven unit as a component of one of several types of range structures is as follows. The oven tank T is combined with an element 10 (FIG. 6) as described above, now serving as a main oven back, together with a bat 35 of suitable insulating material such as glass fiber, rock wool or the like interposed therebetween and the parts secured as by tie plates 37 on opposite sides thereof.

Thus, the integrated oven tank unit consists of the open-ended tubular element T, which in the illustrated embodiment of the invention is shown as substantially rectangular in cross-section, with a rim at the front thereof and with a closure at the rear thereof, which parts are derived from a unitary pan-like element 10 shown in FIG. 3. This pan-like element, after severance along line 22, as described above, is fitted into the opposite ends of the tubular unit so that the lateral wall portions 17b and 17a are affixed to the lateral walls of the tank unit, leaving the peripheral face 25 extending transversely and outwardly from the lateral walls 17b and the peripheral flange 15 extending transversely and rearwardly from the peripheral face 25 in parallel to the portions of the lateral walls 17b.

Another pan-like element 10, identical to the one which is severed to form the front and back of the oven tank unit, is positioned congruously with respect to the closed end of the tank unit and the planar face 20 thereof is spaced from the planar face 27 of the tank closure (FIG. 5). The second pan-like element 10 is provided with lateral walls, a peripheral face and peripheral flanges similar to those described above with respect to the first element, so that the peripheral flanges 15 of both pan-like elements are coplanar.

The tie plates 37 serve to interconnect the main part of the oven unit with the back, leaving a gap therebetween for the layer of insulating material 35, as shown in FIG. 6.

The next stage of the operation consists in the wrapping of a batt of similar insulating material 40, preferably as a sleeve, around the top, bottom and sides of the oven tank T and disposed between the front and rear elements 25 and 10, respectively. Preferably this batt of insulating material is of such thickness that its outer surface lies substantially flush with the outermost edges of parts 25 and 10, as best seen in FIG. 7.

Insulation retaining plates 42 or the like of flexible sheet metal are snapped into place on opposite sides and on the bottom of the oven tank T and are retained between the front and rear elements 25 and 10 within the peripheral flanges thereof. Reinforcing plates or bars 44 are secured by screws, spot welding or the like to the lower side portions of oven tank T and extend therebelow. To the forward portion of these plates 44 are secured, as by screws or the like, suitable door hinge plate members 45. (FIG. 8.)

Figure 10:
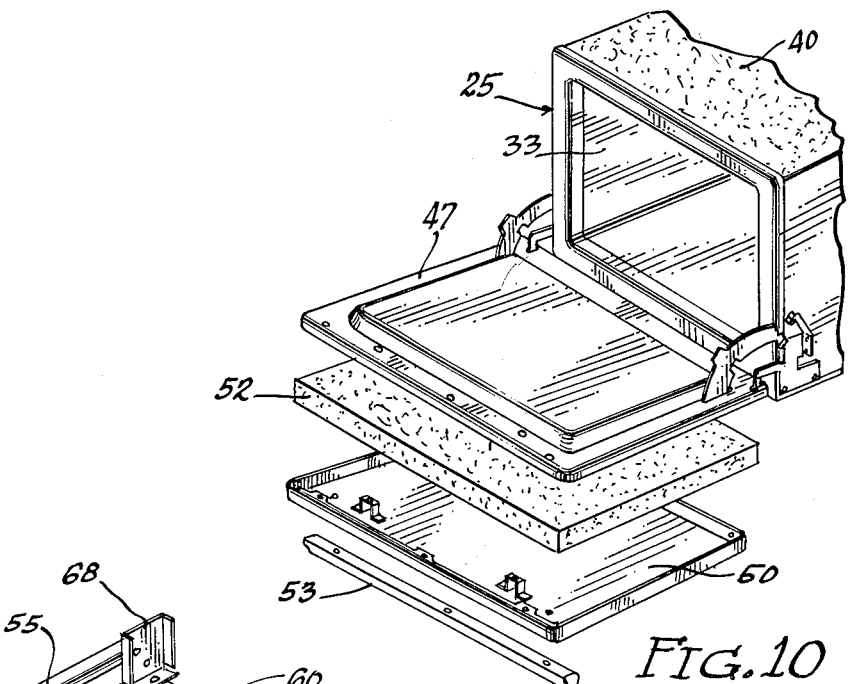
FIG. 10 is a fragmentary exploded perspective view of the front portion of the oven as seen in FIG. 8, detailing the door parts in exploded relation.

In the next stage of the assembly operation the oven door is assembled and connected to the oven T. In the particular embodiment illustrated in FIGS. 10 and 11, we have shown a preferred form of door, although it will be understood that various door and hinge constructions may be used. This particular door includes a liner member 47 which is directly hinged to the oven tank T and an outer panel 50 with a batt of insulation 52 interposed therebetween. A suitable handle 53 is attached to the outside of the door.

Figure 11:
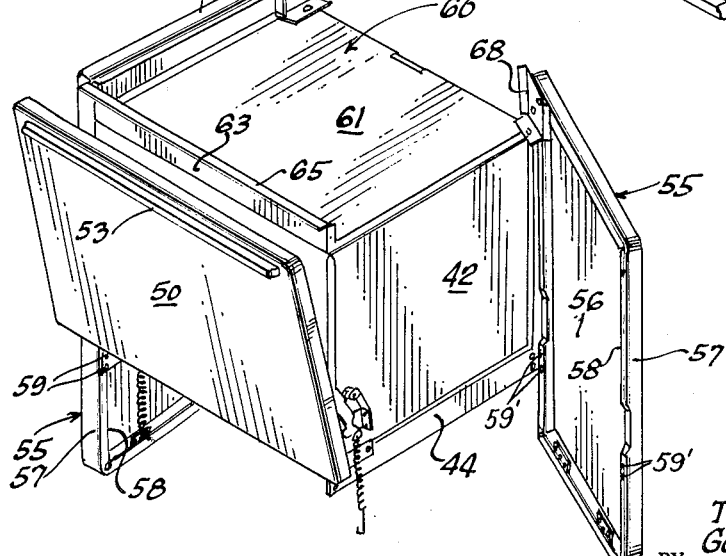
FIG. 11 is a perspective and partially exploded view at a later stage in the assembly operation of the oven unit with other parts of a range embodying our invention.

Referring to FIG. 11, the next step in the assembly operation consists in mounting side panels 55. These panels, which are rectangular sheet metal members, comprise a main planar portion 56, a marginal flange 57 extending normal to said planar portion 56 and entirely around the periphery thereof, and an inner flange 58 generally parallel to the planar portion 56 (see FIG. 2). The side panels may be attached by means of screws 59 engaging screw holes 59' to secure the flange 58 to the angle members 44 at the front and rear extremities of the latter, as seen for example in FIG. 11.

Just prior to mounting of the side panels 55 a top insulation liner indicated generally by the numeral 60, is placed in position, said liner comprising a sheet metal plate 61 substantially covering the top of the oven tank T and having an upstanding flange 63 at the front and a forwardly extending top flange 65. Said top liner plate may be attached as by means of screws to the front portion 25 of the oven tank T and may be snapped under the marginal flange 15 of the main oven back member 10.

Figure 12:
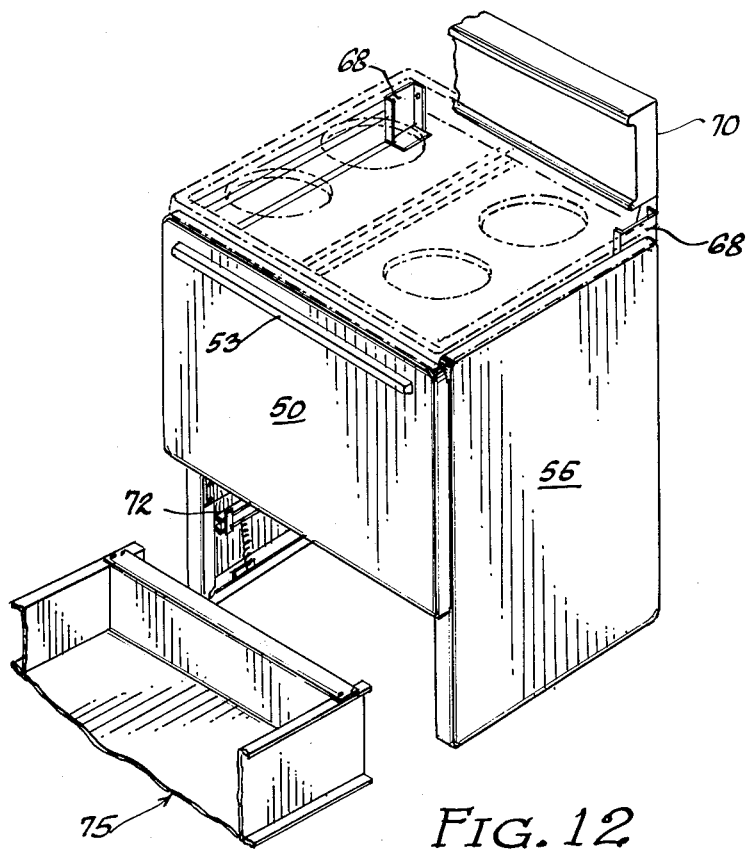
FIG. 12 is a perspective view of a complete range shown partly assembled in FIG. 11.
Figure 9:
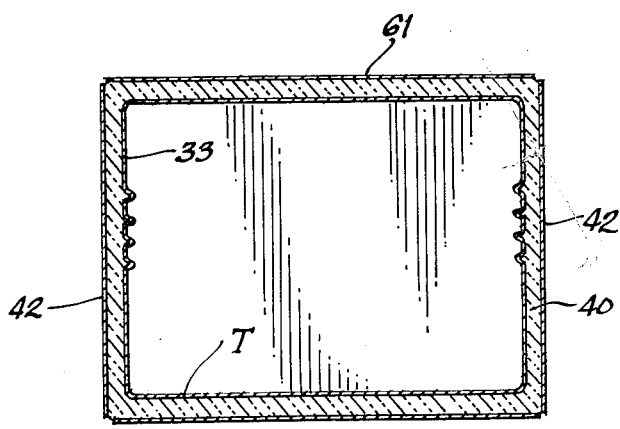
FIG. 9 is a sectional view taken substantially along line 9—9 of FIG. 8.

Attached to the upper rear corners of each of the side panels 55 as by screws is a bracket or corner gusset 68 for the mounting of a back guard or splash panel 70 (FIGS. 11 and 12).

The remaining operations in the completion of the range are more or less standard and not peculiar to this invention, including assembly of electrical or gas heating elements for the oven and for top cooking, attachment of suitable guides 72 for a drawer 75, etc. The top cooking units are disposed over top linear slate 60 and within the space defined by the upper portions of side panels 55.

The upstanding flange 63 serves as a part of the oven front abutting the door and flush with the front rim portion of the oven.

It will be seen that the cooking range just described and its method of assembly represent a marked improvement over previously known ranges from the standpoint of simplicity, reduction of weight, elimination of parts and greatly simplified assembly. The skeleton frame member usually employed in ranges of this type is completely eliminated. Furthermore, the presence of a dead air space between the side panels 55 and the oven tank T provides additional insulation, insuring a low temperature in these side panels when the oven is in operation.

The side panels 55 provide supporting legs for the range structure as well as providing an attractive, sanitary trim.

Our improved construction results in a saving of approximately 25% in weight as compared with standard range structures presently on the market. This feature results not only in a great saving in production cost, due to the reduction in metal, but also in reduced freight charges.

An important advantage accruing to our invention, and particularly in connection with the improved oven unit, is that it makes possible the production of a variety of cooking and baking constructions of modern design. Certain examples illustrative of this application of our invention are shown in FIGS. 15–17, inclusive, in addition to the range structure shown in FIG. 12 and described in detail above.

Thus, FIG. 15 shows a range generally similar to that of FIG. 11 but embodying a double compartment or double oven C and C'. These compartment elements may be constructed in a manner generally similar to the construction of the oven tank T described above. If one of the compartments is to be used merely as a storage compartment for utensils, the insulating material may be omitted. Said compartments C and C' may be made of identical or different dimensions. In the particular range shown in FIG. 15 we have illustrated the compartments C and C' as being of different widths, the height and depth being the same in both compartments. However, it will be understood that a large number of combinations with this particular range design is possible, employing one oven and one storage compartment or two ovens of the same or different dimensions, the overall range structure remaining essentially the same. It will be seen that a standard side panel also may be employed.

In FIG. 16 we have shown the basic oven structure mounted in a wall as a so-called "insert oven."

In FIG. 17 a standard oven unit embodying our invention is shown as a so-called "stack on" oven, mounted in a wall over a wall cabinet B.

Various other changes and variations coming within the spirit of our invention may suggest themselves to those skilled in the art. Hence, we do not wish to be limited to the specific embodiments shown and described or uses mentioned, but intend the same to be merely exemplary, the scope of our invention being limited only by the appended claims.

We claim:

1. An oven unit comprising an open-ended tubular tank unit of predetermined cross-section, a front rim for the open end of said tank unit constituted by the main portion of a pan-like element having a lateral wall closely fitting within and affixed to the front end of said tubular tank unit, a peripheral face extending transversely and outwardly from said lateral wall, and a peripheral flange extending transversely and rearwardly from said peripheral face in parallel to the portions of said lateral wall, a closure for the end of said tank unit opposite to said front rim and constituted by a portion severed from said rim including a portion of said first-mentioned lateral wall closely fitting within and affixed to the rear end of said tubular tank unit and a planar face extending inwardly between the portions of said lateral wall, a back for said oven unit constituted by a congruously positioned pan-like element identical in shape and size to said first-mentioned pan-like element and comprising a lateral wall substantially co-planar with said first-mentioned lateral wall, a peripheral face extending outwardly from said lateral wall, a peripheral flange extending transversely and inwardly from said peripheral face in parallel to the portions of said last-mentioned lateral wall, and a planar face extending transversely between the portions of said last-mentioned lateral wall opposite to said peripheral face and parallel thereto and spaced from and parallel to the planar face of said closure for said tank unit, means for connecting said back to said oven unit to form a space gap between said planar faces, a layer of insulating material within said gap, an insulating layer surrounding said tubular tank unit and the lateral wall of said back, and retaining means for said insulating layer confined in part by said peripheral flanges on said front rim and back.

2. An oven unit comprising an open-ended tubular tank unit of substantially rectangular cross-section, a front rim of generally rectangular outline for the open end of said tank unit constituted by the main portion of a pan-like element having a substantially rectangular lateral wall closely fitting within and affixed to the front end of said tubular tank unit, a continuous peripheral face extending transversely and outwardly from said lateral wall, and a continuous peripheral flange extending transversely and rearwardly from said peripheral face in parallel to the portions of said lateral wall, a closure for the end of said tank unit opposite to said front rim and constituted by a portion severed from said rim including a portion of said first-mentioned lateral wall closely fitting within and affixed to the rear end of said tubular tank unit and a substantially rectangular planar face extending inwardly between the portions of said lateral wall, a back for said oven unit constituted by a congruously positioned pan-like element identical in shape and size to said first-mentioned pan-like element and comprising a substantially rectangular lateral wall substantially co-planar with said first-mentioned lateral wall, a continuous peripheral face extending outwardly from said lateral wall, a continuous peripheral flange extending transversely and inwardly from said peripheral face in parallel to the portions of said last-mentioned lateral wall, and a substantially rectangular planar face extending transversely between the portions of said last-mentioned lateral wall opposite to said peripheral face and parallel thereto and spaced from and parallel to the planar face of said closure for said tank unit, means for connecting said back to said oven unit to form a space gap between said planar faces, a layer of insulating material within said gap, an insulating layer surrounding said tubular tank unit and the lateral wall of said back, and retaining means for said insulating layer comprising plates, the ends of at least some of which are confined by said peripheral flanges on said front rim and back, said peripheral flanges being co-planar on the four sides of said tank unit.

3. An oven unit as set forth in claim 2, including reinforcing bars affixed to the sides of said tank unit adjacent to the bottom thereof and extending therebelow, and a side panel affixed to each of said bars extending therebelow to provide a support for the oven unit as well as the outside trim therefor, said side panel also extending a short distance above the top plate of said tubular tank unit to delineate a space for the surface burners.

4. An oven unit as set forth in claim 2, including reinforcing bars affixed to the sides of said tank unit adjacent the bottom thereof and extending therebelow, a hinge plate affixed to each of said reinforcing bars at the front end thereof, an oven door pivotally mounted on said hinge plates, and a side panel affixed to each of said bars extending therebelow to provide a support for the oven unit as well as the outside trim therefor, said side panel also extending a short distance above the top plate of said tubular tank unit to delineate a space for the surface burners.

5. An oven unit as set forth in claim 4 wherein said retaining means for said insulating layer includes a sheet metal plate for the top of the tubular unit having the rear edge thereof fitting below the peripheral flange at the top of the back pan-like element, the front edge of said sheet metal plate having a vertical panel extending upwardly therefrom and terminating in a forwardly directed horizontal flange, said vertical panel being co-planar with said peripheral face on the front rim at the open end of said tank unit so that said oven door may swing into closed position forwardly of both said vertical panel and peripheral face of the front rim.

References Cited in the file of this patent
UNITED STATES PATENTS

| | | |
|---|---|---|
| 947,779 | Adams | Feb. 1, 1910 |
| 1,502,392 | MacInnes | July 22, 1924 |
| 1,524,961 | Asche | Feb. 3, 1925 |
| 1,579,524 | Gregg | Apr. 6, 1926 |
| 1,586,158 | MacInnes | May 25, 1926 |
| 1,836,639 | Armstrong | Dec. 15, 1931 |
| 2,040,346 | Teller | May 12, 1936 |
| 2,161,537 | Stockstrom et al. | June 6, 1939 |
| 2,253,499 | Rutenber | Aug. 26, 1941 |
| 2,512,521 | Davidson | June 20, 1950 |
| 2,557,496 | Brodbeck | June 19, 1951 |
| 2,644,443 | Barnsteiner | July 7, 1953 |
| 2,646,762 | Ingraham et al. | July 28, 1953 |
| 2,739,584 | Hupp | Mar. 27, 1956 |
| 2,769,440 | Pearce | Nov. 6, 1956 |
| 2,839,044 | Phares | June 17, 1958 |

FOREIGN PATENTS

| | | |
|---|---|---|
| 553,799 | Great Britain | June 7, 1943 |